(12) United States Patent
Kenington et al.

(10) Patent No.: US 9,282,197 B2
(45) Date of Patent: Mar. 8, 2016

(54) METHOD AND APPARATUS FOR MANAGING CALL DATA

(71) Applicant: JDSU UK Limited, Basingstoke (GB)

(72) Inventors: Peter Kenington, Chepstow (GB); Nicholas James Randell, Hants (GB); Christopher Drawater, Reading (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 13/849,245

(22) Filed: Mar. 22, 2013

(65) Prior Publication Data
US 2014/0287739 A1    Sep. 25, 2014

(51) Int. Cl.
*H04M 15/00*  (2006.01)
*H04W 24/10*  (2009.01)
*H04W 4/24*   (2009.01)

(52) U.S. Cl.
CPC ............. *H04M 15/41* (2013.01); *H04W 4/24* (2013.01); *H04W 24/10* (2013.01)

(58) Field of Classification Search
CPC ....... H04W 4/02; H04W 24/10; H04M 15/06; H04M 15/41
USPC ............ 455/422.1, 423, 456.1; 370/338, 252, 370/401; 1/1
See application file for complete search history.

(56) References Cited

U.S. PATENT DOCUMENTS

| | | | |
|---|---|---|---|
| 6,253,264 B1 | 6/2001 | Sebastian | |
| 2002/0034285 A1 | 3/2002 | Jarvi et al. | |
| 2002/0106069 A1* | 8/2002 | Shaffer et al. | 379/207.12 |
| 2003/0120650 A1* | 6/2003 | Wills | 707/5 |
| 2003/0169856 A1* | 9/2003 | Elazar et al. | 379/67.1 |
| 2003/0182502 A1 | 9/2003 | Kleiman et al. | |
| 2004/0177065 A1* | 9/2004 | Tropf | 707/3 |
| 2004/0225665 A1* | 11/2004 | Toyama et al. | 707/100 |
| 2005/0063528 A1* | 3/2005 | Pearson et al. | 379/211.01 |
| 2005/0198008 A1* | 9/2005 | Adler | 707/3 |
| 2005/0288836 A1* | 12/2005 | Glass et al. | 701/29 |
| 2006/0274703 A1* | 12/2006 | Connelly | 370/338 |
| 2007/0049267 A1* | 3/2007 | Kota et al. | 455/423 |
| 2007/0186284 A1* | 8/2007 | McConnell | 726/25 |
| 2007/0214167 A1* | 9/2007 | Nair et al. | 707/101 |
| 2008/0243908 A1* | 10/2008 | Aasman et al. | 707/102 |

(Continued)

OTHER PUBLICATIONS

Manish Singh et al: "SWST: A Disk Based Index for Sliding Window Spatio-Temporal Data", 2012 IEEE 28th International Conference on Data Engineering, Arlington, Virginia, USA, Apr. 1-5, 2012, IEEE, pp. 342-353.*
International Search Report from corresponding PCT application No. PCT/EP2014/05768, Aug. 4, 2014, 5 pages.
Vieira et al., "Querying Spatio-temporal Patterns in Mobile Phone-Call Databases", Mobile Data Management (MDM), 2010 Eleventh International Conference on, IEEE, Piscataway, NJ, USA, pp. 239-248, May 23, 2010.

(Continued)

*Primary Examiner* — Nathan Taylor
(74) *Attorney, Agent, or Firm* — Harrity & Harrity, LLP

(57) ABSTRACT

A data management system and method of managing call data for at least one radio network element within a cellular communication network. The method comprises receiving geolocation associated call data for at least one call within the at least one cellular communication network, arranging the received geolocation associated call data for the call into at least one call data record, and writing the at least one call data record to at least one data storage device, The geolocation associated call data for the at least one call comprises at least two spatial coordinate values for an at least two dimensional spatial reference, and the method comprises indexing the at least one call data record within the at least one data storage device using a single dimensional coordinate value.

20 Claims, 8 Drawing Sheets

(56) References Cited

U.S. PATENT DOCUMENTS

| | | | |
|---|---|---|---|
| 2009/0318132 A1* | 12/2009 | Chiou et al. | 455/423 |
| 2010/0114905 A1* | 5/2010 | Slavik et al. | 707/743 |
| 2010/0306233 A1* | 12/2010 | Zheng | 707/769 |
| 2010/0323687 A1* | 12/2010 | Richter et al. | 455/424 |
| 2012/0196618 A1* | 8/2012 | Lowell et al. | 455/456.1 |
| 2012/0303597 A1* | 11/2012 | Bird et al. | 707/693 |
| 2013/0054495 A1* | 2/2013 | Hawkins et al. | 706/12 |
| 2013/0288709 A1* | 10/2013 | Flanagan | 455/456.1 |
| 2014/0058831 A1* | 2/2014 | Duva et al. | 705/14.45 |
| 2014/0132623 A1* | 5/2014 | Holten et al. | 345/593 |
| 2014/0287740 A1 | 9/2014 | Kenington et al. | |

OTHER PUBLICATIONS

3rd Generation Partnership Project; Technical Specification Group Services and System Aspects; Telecommunication management; Charging management; Charging Data Record (CDR) parameter description (Release 11), GPP Standard; 3GPP Ts 32.298, $3^{rd}$ Generation Partnership Project (3GPP), Mobile Competence Centre; 650, Route Des Lucioles; F-06921 Sophia-Antipolis Cedex; France, vol. SA WG5, No. Vll.6.0, pp. 1-152, Mar. 15, 2013.

Aggarwal, "On Change Diagnosis in Evolving Data Streams", IEEE Transactions on Knowledge and Data Engineering, IEEE Service Center, Los Alamitos, CA, US, vol. 17, No. 5, pp. 587-600, May 1, 2005.

* cited by examiner

METHOD AND APPARATUS FOR MANAGING CALL DATA

FIELD OF THE INVENTION

The field of the invention relates to a method of managing call data for at least one radio network element within a cellular communication network, and a data management system therefor.

BACKGROUND OF THE INVENTION

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™).

The $3^{rd}$ and $4^{th}$ generations of wireless communications, and particular systems such as Long Term Evolution (LTE), have generally been developed to support macro-cell mobile phone communications, and more recently femto-cell mobile phone communications. Here the 'phone' may be a smart phone, or another mobile or portable communication unit that is linked wirelessly to a network through which calls etc. are connected. Henceforth all these devices will be referred to as mobile communication units. Calls may be data, video, or voice calls, or a combination of these.

Typically, mobile communication units, or User Equipment as they are often referred to in 3G parlance, communicate with a Core Network of the 3G wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell. Each base station may have multiple antennas, each of which serves one sector of the cell.

Operators of wireless communication systems need to know what is happening in the system, with as much precision as possible. A particular issue is the need to solve 'faults'. Faults may take a wide variety of forms, but can be summarised as events when the network and/or one or more mobile communication units do not perform as expected.

Modern wireless communication systems allow a high degree of autonomy to individual mobile communication units and to base stations. As a consequence, decisions about setting up and 'tearing down' call links throughout the network are not all made centrally. An additional complication arises from the volume of information generated within the wireless communication system. In one day, a wireless communication system may generate 100 gigabytes of data about calls that have been made in the network.

This volume of data has proved a major obstacle to fault location in existing wireless communication systems. In particular, the need to search through such large volumes of data, for example potentially in the billions (1,000 millions) of records or more, in order to access data relevant to a particular query using conventional database storage methods has proved to be prohibitively slow.

If a traditional approach to storing records in a database was used to store call records, then this would comprise storing each call record in full, with each call record occupying an identical amount of space on the disk, irrespective of the actual amount of data recorded for that call (a short duration call will yield far less data than a long call and/or one involving many changes of serving cell site or call type: voice, data, MMs etc.). In this way, each record could be read individually and independently of all of the other records on disk and could be updated or refreshed if desired.

This traditional approach for storing data is very efficient in most database applications, where the requirement is to extract very specific pieces of information, where records need to be updated periodically and where only a few records need to be accessed at a given point in time. The relevant records can be read and updated, without the need to read or process any unwanted records.

However, when a large number of records (e.g. potentially numbering in the billions) are required to be accessed, separate disk accesses are required to scan/retrieve the individual records, requiring multiple searches of the disk(s) on which the data is stored. As will be appreciated by a person skilled in the art, performing a search of a storage disk and subsequent retrieval of a data record is a relatively slow process in terms of computing time due to the mechanical movement required of the disk's read/write head. If only a small number of records are required to be retrieved, and thus only a small number of disk accesses are required to be made, then the delay experienced by a user is not significant. However, when the number of records required to be retrieved from a storage disk is in the millions, or even billions, then the delay is prohibitively long and prevents prompt access to such records. As a result, with conventional database storage and access techniques, there is a significant delay between a database query being generated for call related data and the data being returned for analysis. Such a delay may be hours or even days, requiring data access to be performed 'off-line'. In order for a network operator to be able to react quickly to detected faults, there is a need for faster access times, and in particular a desire for continuous and near real-time analysis of data; something that is not possible with conventional database storage and access techniques, when faced with the need to access such huge amounts of data.

Geolocation is the identification of the real-world geographical location of an object, such as a mobile communication unit. Geolocation techniques are well known in the art, and as such need not be described in any greater detail herein. Nevertheless, one example implementation of geolocation is described in the Applicant's co-pending International Patent Application No. WO 2010/081658 entitled "GEO-LOCATION IN A WIRELESS COMMUNICATION NETWORK". A network operator may use geolocation to identify the location of a mobile communication unit connected to its network and to associate the location of the mobile communication unit with data or events relating to that mobile communication unit. Such data or events may comprise, for example, quality of service data, fault related events such as dropped calls, etc. As such, geolocation information is an important part of each record in a network operator's database of call records, and is often a key query parameter for network operators when accessing data in order to identify a fault in the network.

The problem of accessing call records is compounded by conventional database storage methods by which spatial (e.g. geographical) information may be stored. Such conventional database storage methods by which spatial information may be stored fall into two categories:

(i) some databases, such as Oracle™, provide a special data storage format for the storage of location information and data associated with this location information; in Oracle such data constructs are referred to as 'spatial extensions' and are typically used for fixed location information, such as the location of shops for a national retail chain, and associated data therefor, such as stock levels etc.;

(ii) for data bases without such a special data storage format, spatially related records may be indexed based on two-dimensional co-ordinates (e.g. X and Y, latitude and longitude, eastings and northings, etc.), with individual call records being created and tagged with respective co-ordinate values.

In either case, the process of accessing data to identify records relating to particular geographical criteria is prohibitively slow, since the record types and methods described above are not designed for rapid access of large numbers of records, and are not capable of enabling large numbers of records to be accessed in near real-time.

A further problem with the use of conventional methods for storing call data is that each call data record contains the full call data for a particular call, which can amount to many kilobytes of data for long mobile calls. Accordingly, such call data records do not enable the effect of a moving call to be taken into consideration; i.e. only a single location etc. is identified and stored for each call, irrespective of how long the call lasted or how far the user had moved. Furthermore, such call data records do not allow the tracking of the changes to the type of service and/or the number of minutes users spend on each type of service (voice, data MMS etc.); i.e. each call is only assigned a single service type, irrespective of how many service types were actually used during the call.

A still further problem encountered by network operators in managing the large volumes of data that they collect is that of efficient and effective retirement of data once it is no longer required. Such retirement of data is necessary in order to provide some means of limiting the amount of data required to be stored. However implementing such retirement of data in a manner that does not become a computational burden on the system is a challenge.

Thus there is a need for an improved method and apparatus for managing call data within a cellular communication network, and in particular spatially related call data.

SUMMARY OF THE INVENTION

Accordingly, the invention seeks to mitigate, alleviate or eliminate one or more of the abovementioned disadvantages singly or in any combination.

According to a first aspect of the invention, there is provided a method of managing call data for at least one radio network element within a cellular communication network. The method comprises receiving geolocation associated call data for at least one call within the at least one cellular communication network, arranging the received geolocation associated call data for the call into at least one call data record, and writing the at least one call data record to at least one data storage device, The geolocation associated call data for the at least one call comprises at least two spatial coordinate values for an at least two dimensional spatial reference, and the method comprises indexing the at least one call data record within the at least one data storage device using a single dimensional coordinate value.

In this manner, only the single dimensional coordinate value may be indexed and used to search for data records within the at least one data storage device. As such, the number of searching operations that are required to be carried out within the data storage devices may be significantly reduced as compared with conventional two dimensional index searching within a spatially-referenced database. In addition, such single dimensional coordinate indexing also takes up less storage space, since only a single index variable need be stored along with the data.

In some examples of the present invention, the method may comprise spatially grouping the call data records based at least partly on a single dimensional coordinate value for the call data records, assembling spatially grouped call data records into data blocks, writing the data blocks to at least one data storage device, and indexing the data blocks within the at least one data storage device using a single dimensional coordinate index.

In some examples of the present invention, the method may further comprise, upon receipt of a call data query, retrieving call data records from the at least one data storage device on a per data block basis.

In some examples of the present invention, the method may further comprise temporally grouping the call data records, and arranging temporally grouped call data records into data blocks.

According to a second aspect of the present invention, there is provided a data management system comprising at least one signal processing module arranged to receive geolocation associated call data for at least one call within the at least one cellular communication network, arrange the received geolocation associated call data for the call into at least one call data record, and write the at least one call data record to at least one data storage device. The geolocation associated call data for the at least one call comprises at least two spatial coordinate values for an at least two dimensional spatial reference, and the at least one signal processing module is further arranged to index the at least one call data record within the at least one data storage device using a single dimensional coordinate value.

According to a third aspect of the present invention, there is provided a cellular communication system incorporating the data management system of the second aspect of the present invention According to a fourth aspect of the present invention, there is provided a non-transitory computer program product having computer-readable code stored thereon for programming a signal processing module to perform the method of the first aspect of the present invention.

In some examples of the present invention, the non-transitory computer program product may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a system and a method for managing call data within a cellular communication network.

In some examples, there is described a method comprising receiving call data for at least one call from the at least one radio network element within the cellular communication network, arranging the received call data into call data records, assembling the call data records into at least one data block, and writing the at least one data block to at least one data storage device. Wherein, in such examples, the method comprises, upon receipt of a call data query, retrieving call data records from the at least one data storage device on a per data block basis.

In some examples, there is described a method comprising receiving geolocation associated call data for at least one call within the at least one cellular communication network, arranging the received geolocation associated call data for the call into at least one call data record, and writing the at least one call data record to at least one data storage device. Wherein, in such examples, the geolocation associated call data for the at least one call comprises at least two spatial coordinate values for an at least two dimensional spatial reference, and the method comprises indexing the at least one call data record within the at least one data storage device using a single dimensional coordinate value.

In some examples, there is described a method comprising receiving call data for at least one call from the at least one radio network element within the cellular communication network, arranging the received call data into call data records of a non-fixed size, and writing the call data records to at least one data storage device such that the call data records are stored adjacent one another.

In some examples, there is described a method comprising receiving call data for at least one call from the at least one radio network element within the cellular communication network, arranging the call data for the at least one call into a plurality of call data records based at least partly on intra-call events, and writing the call data records to at least one data storage device.

In some examples, there is described a method comprising assigning at least one storage bin within at least one data storage device to a time period, and storing call data records for at least one call in the at least one storage bin comprising respective event times corresponding to the time period assigned thereto.

Figure 1:
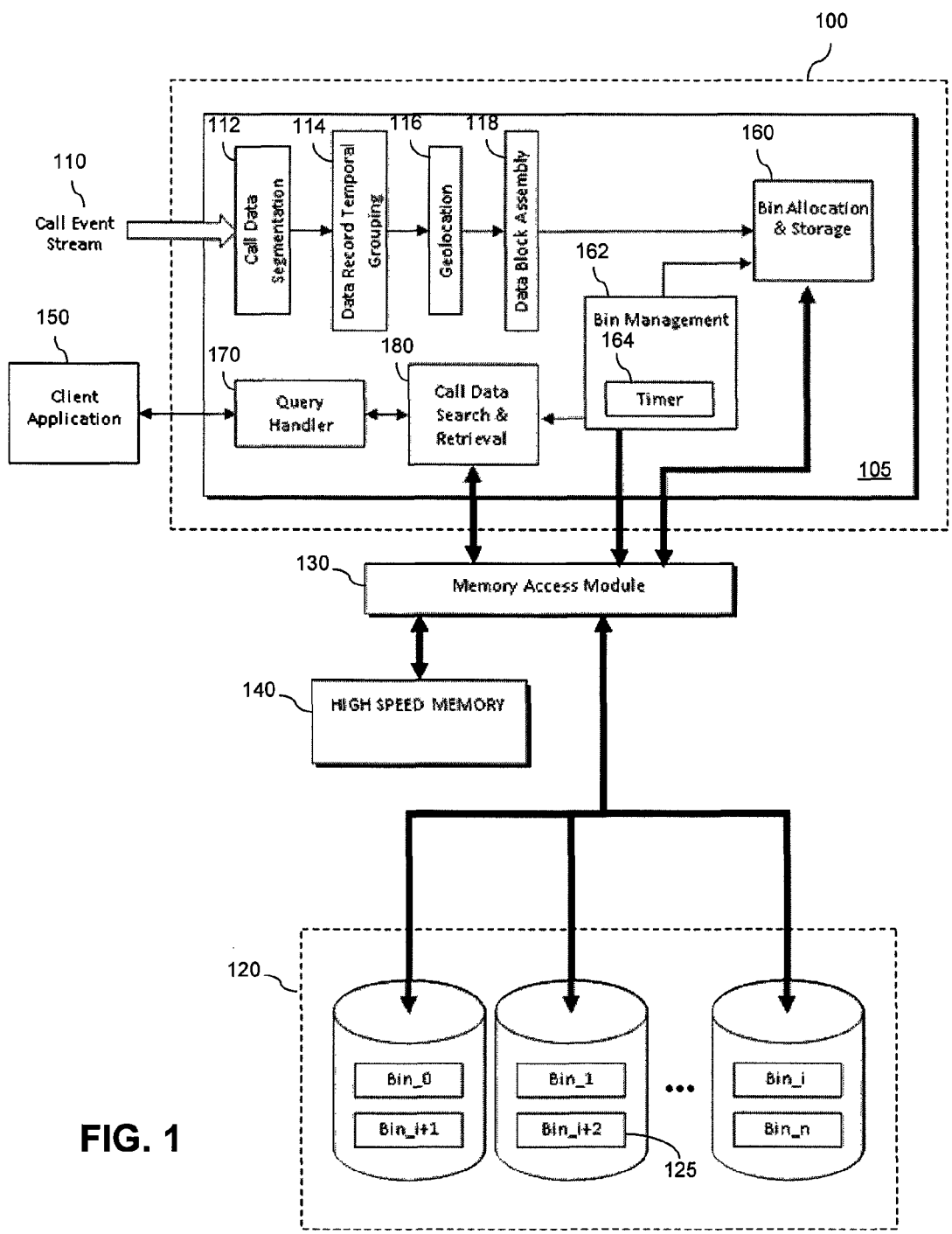
FIG. 1 illustrates a simplified block diagram of an example of a data management system.

Referring first to FIG. 1, there is illustrated a simplified block diagram of an example of a data management system 100 such as may be used for storing and subsequent access of call data from one or more wireless communication networks. In the illustrated example, the data management system 100 is arranged to receive call event data 110. Such call event data may comprise any data relating to calls within one or more wireless communication networks, for example comprising call service type (e.g. data call, voice call, etc.), call event times (e.g. time of call initiation, time of change of service type, time of call termination, etc.), quality of service information, neighbour cell measurement reports, etc. The data management system 100 stores the received event data within one or more data storage device(s), such as those illustrated generally at 120, as described in greater detail below.

In the illustrated example, the data management system 100 is operably coupled to the data storage device(s) 120 via memory access module 130, which is arranged to receive and implement data access requests (read and write) from the data management system 100 to the data storage device(s) 120. The data storage device(s) 120 may comprise any suitable form of non-volatile mass storage devices, such as magnetic disk drives, solid-state disk drives or the like. As will be appreciated by a those skilled in the art, magnetic disk drives, for example, provide a (relatively) low cost solution to mass storage of computer data, but suffer from relatively slow access times compared with other forms of computer data storage such as random access memory (RAM) and the like.

In the illustrated example, the data management system 100 is further operably coupled to one or more high speed memory elements 140 (at least relative to the data storage device(s) 120) via the memory access module 130.

The data management system 100 is further arranged to receive queries relating to data stored within the data storage device(s) 120, for example from one or more client applications 150. Upon receipt of such a query, the data management system 100 is arranged to retrieve data corresponding the received query from the data storage device(s) and return the retrieved data to, in the illustrated example, the client application from which the query was received, as described in greater detail below.

The data management system 100 may be implemented in any suitable manner. For example, and as illustrated in FIG. 1, the data management system 100 may be implemented by way of computer program code stored within one or more computer-readable storage devices and arranged to be executed on one or more signal processing modules, such as the signal processing module illustrated generally at 105. The computer program code may be stored within one or more memory element(s). Such memory element(s) may comprise any form of computer-readable storage device, such as a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory. Accordingly, in the illustrated example the computer program code may be executed from, say, high speed memory 140.

In the illustrated example, the data management system 100 receives the call event data as a stream of raw data 110. A call data segmentation component 112 of the data management system 100 is arranged to receive the raw call event data stream 110, and perform call data segmentation whereby the call event data is arranged into individual call data records. A call data record may comprise:

1) Call connection setup information (i.e. information concerned with the establishment (set up) of a new voice or data call, for example including the time at which such a call was set up);

2) Call closedown information (i.e. information concerned with the closing down of a voice or data call, for example including the time at which such a call was closed down and the reason why it closed down);

3) Radio link information, (for example including information concerning which base-station(s) the call is connected to);

4) Measured radio propagation delay of radio signals from the base-station to the mobile communication unit (handset), or vice versa;

5) The radio bearer or bearers involved during the call (e.g. $3^{rd}$ Generation (3G), High Speed Packet Access (HSPA), HSPA+, Long Term Evolution (LTE), etc.)—more than one may be involved, for example during a video-conferencing call;

6) The type of call (e.g. voice, data, Short Message Service (SMS), Multimedia Messaging Service (MMS) etc.);

7) Measurement reports, such as:
Cell sites which are visible to the handset;
Timing values (e.g. offsets from the handset's master clock at which the base station's signals are seen);

8) Received signal code power (RCSP)—effectively received signal strength and signal-to-noise ratio in the form of Ec/No); and 9) Subscriber information (e.g. IMSI (International Mobile Subscriber Identity) and IMEI (International Mobile Equipment Identity))

It is to be understood that the term 'call data record' as used herein in the context of the present invention refers a 'unit' of call data corresponding to a particular call (or part of a call). Specifically, it is to be understood that such a call data record contains substantially no padding.

In the illustrated example, the call data records are then provided to a data record temporal grouping component 114 of the data management system 100, which is arranged to group the call data records according to their respective event times (a call data event time being, for example, a time at which a call is initiated). For example, call data records may be grouped into predefined, fixed duration event time intervals (e.g. comprising fixed durations of one or more hours). Alternatively, call data records may be grouped into predefined periods during the day and/or week and/or month and/or year. For example, such grouping may be arranged to take into account predictable and/or consistent variations in call event density (e.g. fewer calls may occur at night when people are typically asleep, whilst certain periods during the day may typically comprise a higher call volume).

It is contemplated that call data records may additionally/alternatively be grouped based on any other suitable criteria. For example, grouping by location, call-type, base-station connected to, subscriber and/or device or records derived from subscriber/device etc.

In the illustrated example, a geolocation component 116 then performs geolocation in relation to the individual call data records, and spatial information is added to each individual call data record. Geolocation is the identification of the real-world geographical location of an object, such as a mobile communication unit. Geolocation techniques are well known in the art, and as such need not be described in any greater detail herein. Nevertheless, one example implementation of geolocation is described in the Applicant's co-pending International Patent Application No. WO 2010/081658 entitled "GEO-LOCATION IN A WIRELESS COMMUNICATION NETWORK". In the context of the illustrated example of the present invention, geolocation may be performed to determine the location of a mobile communication unit to which a particular call record relates, at the time of the call event to which that call record relates. Additionally/alternatively, where Global Positioning System (GPS) data for a mobile communication unit is available, such GPS data may be used to determine the location of that mobile communication unit. The spatial information corresponding to the determined location of the mobile communication unit may then be added to the respective call data record. Such spatial information may be in the form of two-dimensional co-ordinates (e.g. X and Y, latitude and longitude, eastings and northings, etc.), with individual call records being 'tagged' with respective co-ordinate values. Alternatively, if supported, a special data storage format for the storage of location information and data associated with this location information may be used for the spatial information. For example, in Oracle™ databases such data constructs are referred to as 'spatial extensions'.

It will be appreciated that in some alternative examples, such geolocation and addition of spatial information to the data records may equally be performed before the temporal grouping of the data records performed by the data record temporal grouping component 114.

A data block assembly component 118 of the data management system 100 is then arranged to assemble the temporally grouped call data records comprising spatial data into data blocks.

Figure 2:
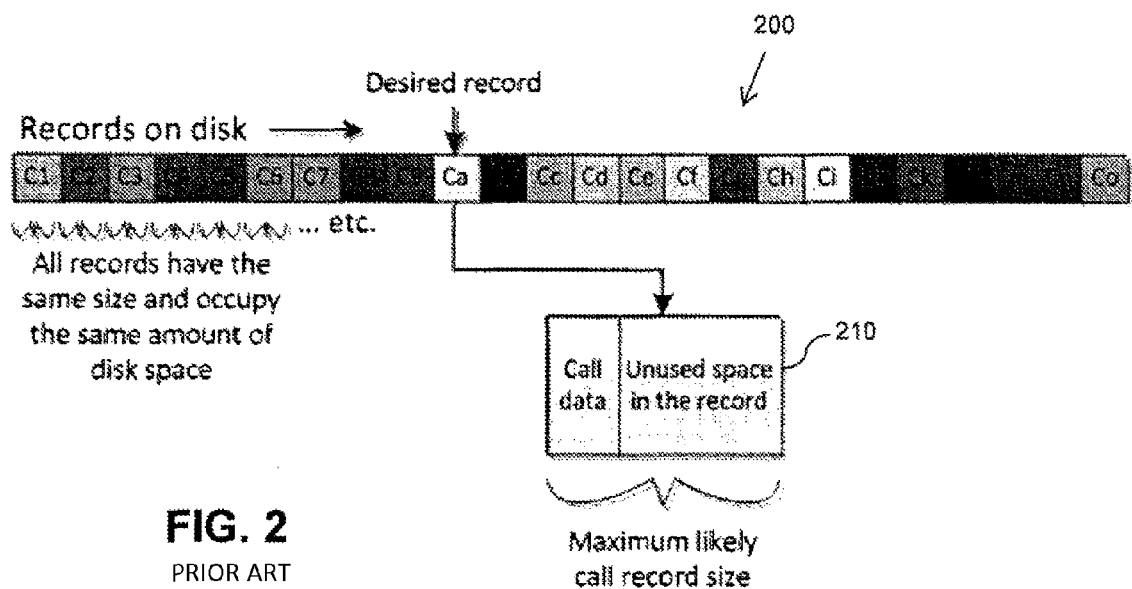
FIG. 2 illustrates a conventional approach of storing call data.

FIG. 2 illustrates a conventional approach of storing call data records 200 on, for example, a magnetic storage disk or other similar mass storage device. Each call data record is stored in full and occupies its own accessible 'block' of storage on disk. In this way, each call data record can be read individually and independently of all of the other call data records. This approach is very efficient in most database applications, where the requirement is to extract very specific pieces of information and where only a few records need to be accessed at a given point in time. The relevant records can be read, without the need to read or process any unwanted records.

In the case of FIG. 2, record Ca 210 has been selected and is read from the storage device. Typically each record contains the full call data for a particular call, which can amount to many kbytes of data for long mobile calls. Extracting data about a single call, on an occasional basis, may be realistic by this method. However processing and extracting the large numbers of records relevant to a particular query from operators of wireless communication systems who need to know what is happening in the system with as much precision as possible, for example to identify and solve 'faults', is wholly unrealistic. Such a query may relate to a need to generate a map of actual user data rates at all points in a city at a particular period during the day or averaged across a whole day. An offline 'batch processing' approach is adopted by conventional systems, whereby a query is initiated by a user and left. The user may then return after all of the relevant data records have been extracted and pre-processed (e.g. for a 1 hour period or longer). However it does not allow full capture and analysis of all stored call data, continuously, in near real-time.

Figure 3:
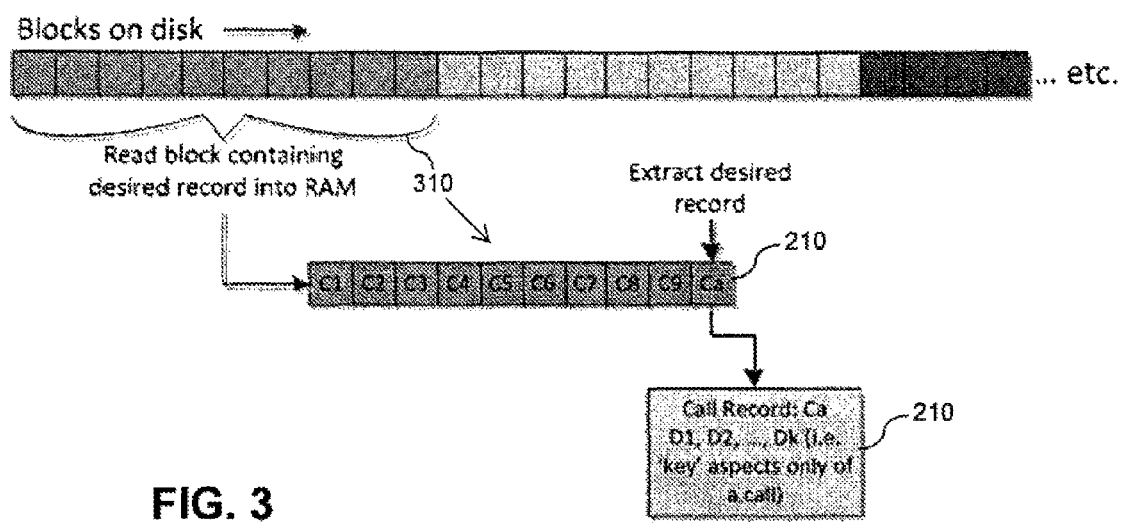
FIG. 3 illustrates an example of a method of storing call data records.

FIG. 3 illustrates an example of a proposed method of storing call data records. In the example illustrated in FIG. 3, a large 'chunk' of call data records are stored as a single accessible block 310. This 'chunk' of data may be, say, 1 Mbyte, and may contain, say, 128 of the conventional data blocks referred to above that are conventionally used to store a single call data record. When a call data record is required to respond to a particular query, the entire 'multi-record' block is retrieved from storage. The retrieved block of data contains the wanted record and many others besides (some of which may also be required to satisfy the particular user query and the remainder of which will be surplus to requirements).

Reading such a large amount of data in order to obtain a relatively small number of call data records may seem wasteful and potentially slow. However, when disk access times are taken into account, this is demonstrably not the case. Typically, a fast data storage disk will take perhaps 5-10 ms to find a block of data which it needs to read. It will then transfer the data at a rate of perhaps 200 Mbytes/s. In other words, the access time for the disk is equivalent to the read time for perhaps 2 Mbytes of data. Given that a particular user-query from a network operator will typically need to access data from a very large number of call records (and perhaps all call records for a given cell, city or time period), then it is much more efficient to use large storage 'chunks' on a disk and process the call records themselves in a faster storage medium (e.g. RAM) in parallel to the extraction process (from disk) continuing.

The approach illustrated in FIG. 3 leads to a data store structure which utilises large blocks of data written to disk. These 'blocks' consist of a large number of call records, and are accessed and read from disk as a single 'per-block' operation. This means that the disk's search/access time is deployed relatively infrequently compared to the number of call records being accessed, and consequently speeds up 'read' operations where large numbers of data records are required to be accessed.

Thus, in some examples of the present invention, the data block assembly component 118 of the data management system 100 illustrated in FIG. 1 may be arranged to receive call data for at least one call from at least one radio network element within a cellular communication network, arrange the received call data into call data records, assemble the call data records into at least one data block, and write the at least one data block to at least one data storage device, wherein the method comprises, upon receipt of a call data query, retrieving call data records from the at least one data storage device on a per data block basis.

In some alternative examples, the call data records may comprise geolocation information for the call data, and the data block assembly component 118 of the data management system 100 may be arranged to spatially group the call data records based at least partly on a single dimensional coordinate value for the call data records, and assemble spatially grouped call data records into data blocks.

In some alternative examples, the data block assembly component 118 of the data management system 100 may be arranged to index data blocks within the at least one data storage device based at least partly on a single dimensional coordinate index corresponding to the single dimensional coordinate value for the call data records.

In some alternative examples, the data block assembly component 118 of the data management system 100 may be arranged to temporally group the call data records, and arranging temporally grouped call data records into data blocks.

Referring back to FIG. 2, which illustrates the conventional approach of storing call data records 200, each call data record is stored in full within a block that occupies an identical amount of space on the disk, irrespective of the actual amount of data recorded for that call (a short duration call will yield far less data than a long call and/or one involving many changes of serving cell site or call type: voice, data, MMS etc.).

In the case of FIG. 2, record Ca has been selected and is read from the storage device. It contains the full call data for a particular call, which can amount to many kbytes of data for long mobile calls. Even if there is relatively little data associated with a particular call, a minimum disk allocation block size of, say, 8 k bytes is used for the data record, leaving much of that block being null/redundant, as shown.

In most databases, spatially-related data needs to be written and re-written many times. For example, a typical conventional scenario for spatially-related data being stored within a database may comprise the stock status for a given retail store or the daily takings at a petrol station. The store/petrol station does not move (and thus the spatially related data relating thereto which identifies the location of the store/petrol station does not change), only the data (e.g. stock level) associated with the store or petrol station changes. Typically, record sizes vary, for example a shop-related record may allow provision for a greater stock level or range of stock at Christmas, or provision may be included for future stock expansion. Equally in times of recession, stock levels or ranges may shrink.

Using conventional database storage methods, a maximum record length would be determined, and the data records would be stored in fixed sized blocks of the maximum determined record length in order enable data records to be re-written (e.g. updated) without affecting adjacent data records. The use of fixed sized blocks of data in which the individual data records are stored enables such variations in, for example, stock size to be accommodated and to allow the data within those records to be updated (e.g. re-written) as often as necessary without effecting other (e.g. adjacent) data records. In this case, there are typically large 'gaps' between the actual data for adjacent records.

However, storing call data in this manner is extremely inefficient in terms of storage space used. Given the large volumes of data required to be stored for a wireless communication network, such inefficient use of storage space can prove to be extremely costly due to the additional storage space that is required to be provided and maintained. Furthermore, any such large gaps between data records slows down the accessing of the records.

Figure 4:
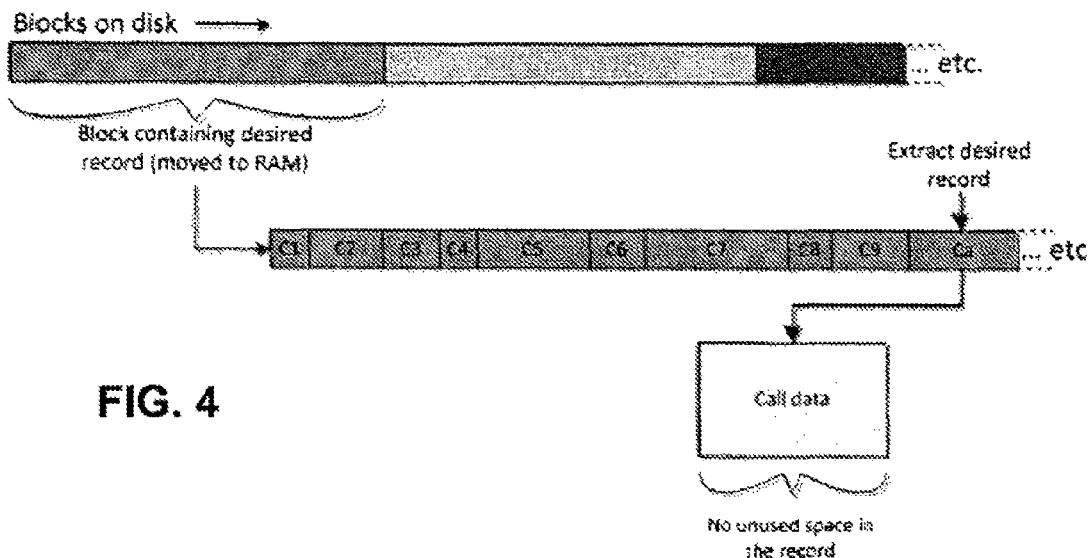
FIG. 4 illustrates a further example of a method of storing call data records.

FIG. 4 illustrates a further example of a proposed method of storing call data records. In the example illustrated in FIG. 4, in addition to 'chunks' of call data records being stored together in large blocks of data (as illustrated in FIG. 3 and described above), individual call data records are stored substantially immediately adjacent to one another such that there are substantially no (or minimal) wasted or null bytes in between (as would typically be the case with most database records). In other words, a short call record, of maybe 50 bytes, appears substantially adjacent to a longer record of, say, 100 bytes, which in turn appears substantially adjacent to another of, say, 75 bytes and so on. This variable record size is illustrated in FIG. 3.

As described above, a more conventional scenario would be to determine the maximum record length (say 100 bytes) and allocate all blocks to be 100 bytes long (thereby wasting 50 bytes and 25 bytes respectively, in the above example). In this manner, data records are able to be re-written (e.g. updated) without affecting adjacent data records.

However, the present inventors have recognised that complete call data records for a wireless communication system are not required to be updated once they have been captured and stored. That is to say such call data records are 'write once, read many times'. As such, the call data records are not required to be individually re-written and merely 'expire' after a period of time (e.g. a number of days, weeks, etc.), at which point the data records may be over-written 'en-masse', e.g. whole blocks of data at a time. Accordingly, the data call records may be written with a variable record length, in contiguous 'chunks', thereby optimising the use of storage and substantially reducing or even eliminating the need to read 'null' data from the disk. This leads to a significantly more efficient use of data storage space, and also an improvement in the reading speed for the relevant data, since relevant data is all that is ever read from the disk (i.e. no need to read large amounts of null data).

Thus, in some examples of the present invention, the data block assembly component 118 of the data management system 100 illustrated in FIG. 1 may additionally/alternatively be arranged to receive call data for at least one call from the at least one radio network element within the cellular communication network, arrange the received call data into call data records of a non-fixed size, and write the call data records to at least one data storage device such that the call data records are stored adjacent to one another.

A bin allocation and storage component 160 of the data management system 100 illustrated in FIG. 1 allocates each assembled data block to a storage 'bin' within one or more of the data storage devices (e.g. magnetic disks) 120, such a bin being indicated at 125 in FIG. 1. For example, each bin 125 may be implemented by way of a partition. As is well known in the art, a partition is a division of a logical database or its constituting elements into distinct independent parts, or 'bins' as referred to herein. Typically, each partition (bin) comprises a set of 'mini-tables' with their own indexes and data all stored together. Additionally/alternatively, individual bins 125 may be implemented by way of a physically separate data storage device or by separate directories, although care would need to be taken to ensure that each directory occupied a contiguous area of storage space on a disk and does not become fragmented.

In the illustrated example, a bin management component 162 of the data management system 100 may be arranged to establish the bins (e.g. partitions) within the data storage devices 120, for example via memory access module 130, and to configure the bin allocation and storage component 160 to allocate the assembled data blocks to respective storage bins 125 according to any suitable requirements or organisational criteria.

Having allocated a data block to a storage bin 125, the bin allocation and storage component 160 then stores the data block in its allocated storage bin 125. For example, and as illustrated in FIG. 1, the bin allocation and storage component 160 may send a write access request to the memory access module 130 comprising the data block to be stored, and indicating which bin the data block is to be stored in. Upon receipt of such a write access request, the memory access module 130 may then perform the necessary steps to write the data block to the appropriate area in memory (i.e. the appropriate bin 125), and may return a confirmation of the writing of the data block to memory upon completion thereof.

In a conventional spatially-referenced database, whether using the spatial functionality built into the database or standard indexes on location, spatially related records are typically indexed based on two-dimensional co-ordinates (e.g. X and Y, latitude and longitude, eastings and northings, etc.), with both co-ordinates being used to index a particular record. The database system will search all records until it finds a specific X, Y match and then extract the data contained in that record, or use a further index, e.g. stock number in the case of a shop, to extract a specific piece of information. This process ensures that only the spatially relevant information (and no unwanted or irrelevant information) is extracted and forwarded for further processing or display by the relevant application engine.

Figure 5:
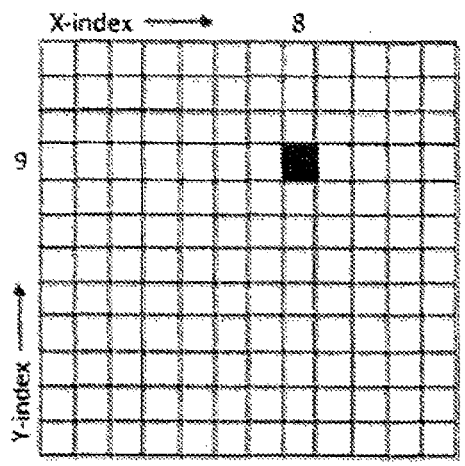
FIG. 5 illustrates an example of conventional two dimensional index searching within a database.

FIG. 5 illustrates an example of such conventional two dimensional index searching within a database. In the example illustrated in FIG. 5, a search is carried out for the pair of coordinates X=8 and Y=9, which returns the data denoted by variable V.

Figure 6:
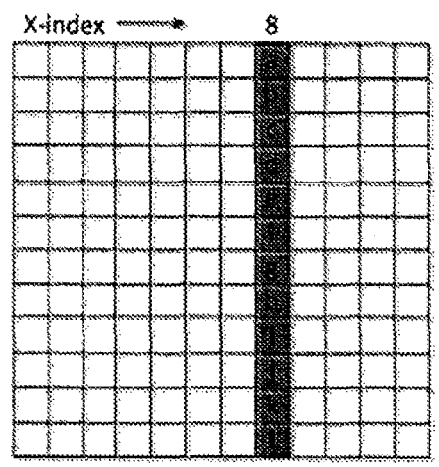
FIG. 6 illustrates an example of spatial indexing and searching.

In accordance with some example embodiments of the present invention, a different approach to spatial indexing is proposed. FIG. 6 illustrates an example of such an approach to spatial indexing and searching. In the example illustrated in FIG. 6, only a single coordinate (X-index) is indexed and used to search for data records, which in the example illustrated in FIG. 6 comprises all records for which X=8, the individual data records being designated by the letters 'a' to 'l'.

In this manner the number of searching operations that are required to be carried out within the data storage devices may be significantly reduced, for example by approximately 50%. The returned data records will contain the required information. However, much of the data extracted may be outside of required second coordinate parameters, and thus be redundant and ultimately discarded. This may at first sight seem like a slow, wasteful process. However this is not the case where the data is stored on, for example, a mechanical hard disk. As previously mentioned, it is much faster to search for, and access, a relatively large amount of data on a hard disk, for subsequent processing in RAM, than it is to undertake a more precise (X,Y) search on a hard disk and to extract a smaller amount of data directly from the hard disk (which needs no further searching).

In addition, this approach also takes up less storage space, since only a single index variable need be stored along with the data. This may seem to be a relatively trivial saving. However the sheer number of call data records stored for a single wireless communications network means that the space occupied by these index variables is not insignificant. The records themselves may only be a few tens of bytes each, making the (relatively large) index variable a not insignificant part of this storage space.

As previously mentioned in relation to FIG. 3 above, a large 'chunk' of call data records are stored as a single accessible multi-record block 310. In accordance with some example embodiments, it is contemplated that the (already temporally grouped) call data records may be further, spatially, grouped based upon a single dimensional coordinate value therefor, such coordinate values having been added to the call data records by the geolocation component 116 in the example illustrated in FIG. 1. The data blocks may then be assembled such that each data block comprises, say, call data records comprising the same single dimensional coordinate value, or comprising single dimensional coordinate values within a specified range of such values. In this manner, a single dimensional coordinate indexing may be used for accessing the data blocks.

Thus, in some examples of the present invention, the data management system 100 illustrated in FIG. 1 may be arranged to receive geolocation associated call data for at least one call within the at least one cellular communication network, arrange the received geolocation associated call data for the call into at least one call data record, and write the at least one call data record to at least one data storage device. Furthermore, the geolocation associated call data for the at least one call may comprise at least two spatial coordinate values for an at least two dimensional spatial reference, and the bin allocation and storage component 160 may be arranged to index the at least one call data record within the at least one data storage device using a single dimensional coordinate value.

In some examples, the call data records may be spatially grouped based at least partly on a single dimensional coordinate value for the call data records, and the spatially grouped call data records may be assembled into data blocks. The bin allocation and storage component 160 may thus be arranged to write the data blocks to at least one data storage device, and index the data blocks within the at least one data storage device using a single dimensional coordinate index.

As will be appreciated, a single call may last a significant amount of time, with the mobile communication unit involved in that call moving a significant distant during that time, in particular if located within a moving vehicle. Furthermore, the type of service for that call (e.g. data call, voice call, etc.) may change. With conventional approaches to storing call data, all call data relating to a single call is stored within a single call data record, irrespective of how long the call lasted, how far the user had moved or how many service types were actually used during the call. In particular, such a conventional call data record may only comprise information relating to where and when the call was initiated, and what the initial data service used was. As such, conventional approaches to storing call data do not enable the progress of a call to be 'tracked'. In particular:

only a single location can be provided for each call, irrespective of how long the call lasts or how far the user has moved; and each call can only be assigned a single service type, irrespective of how many service types are actually used during the call.

In some further examples of the present invention, calls may be recorded in 'segments' (as will be described), which allows the progress of a call to be tracked and stored (e.g. which cell sites are used, which type of service is used and any changes to the service type during the call). For example, calls may be broken down into 'call segments'. There may be one or more of these segments for each actual call. Examples of the criteria for ending a particular segment and beginning a new one may comprise one or more of:

The first segment begins when a call from a particular user device (e.g. phone, data dongle) is initiated;

A segment ends based upon any of the following events:
 The call is ended by the user;
 The call is terminated for any other reason (e.g. loss of network coverage or a network fault);
 A specific (absolute) time is reached (see below);
 A relative time (e.g. based on call duration) is reached;
 The network or handset generates a new measurement report (e.g. when the user is handed over to a new cell site or sector); and/or
 There is a change in the service type (e.g. from a voice to a data call or from a voice call to an MMS).

Other than when a call is ended, the end of a segment leads seamlessly to the initiation of a new segment.

The 'specific absolute time' criterion is intended to limit the length of segments and also to allow them to be searched/used more easily (e.g. for network operator queries regarding network problems in a given time period or at a specific time). For example, such a time period may comprise 15 minutes such that absolute time values are set to 'on the hour', '15 minutes past the hour' etc. However, any other suitable specific absolute time criterion may be implemented.

Advantageously, such call segmentation:
 enables the location of a moving call to be tracked (i.e. multiple locations can be provided for a single call, to track the user's progress, geographically, within the network);
 allows the tracking of the number of minutes users spend on each type of service (voice, data MMS etc.); and
 keeps the management of the database simple (old records can be eliminated easily, without having to use detailed (and slow) search criteria to identify records which can be 'retired'), as discussed in more detail below.

Thus, in some examples of the present invention, the call data segmentation component 112 of the data management system 100 illustrated in FIG. 1 may additionally/alternatively be arranged to receive call data for at least one call from at least one radio network element within a cellular communication network and arrange the call data for the at least one call into a plurality of call data records based at least partly on intra-call events. Such an intra-call event may comprise at least one from a group comprising at least one of:
 an initiation of the at least one call;
 a call data segmentation time period expires;
 a generation of a measurement report;
 a change of call service type.

In some examples, the call data segmentation component 112 may be configured to arrange the call data into one call data record per intra-call event.

In some examples, the call data segmentation component 112 may be arranged to chronologically divide the call data between a plurality of call data records based at least partly on intra-call events occurring.

Referring now to the process of retrieving call data from the data storage devices 120 when a query is received, for example from a client application 150, a query handler 170 of the data management system 100 extracts the required data parameters and generates search criteria for data to be retrieved. A call data search and retrieval component 180 of the data management system 100 initiates an initial 'coarse' search within the data storage devices 120 based on, for example, spatial and temporal search criteria.

In particular, as described above, the call data records may be stored within data blocks that consist of a large number of spatially and temporally grouped call data records, and are accessible from disk on a 'per-block' basis, with the data blocks being stored within allocated bins 125. As also described above, the data blocks may be indexed within their respective bins 125 using a single dimensional coordinate reference value.

The call data search and retrieval component 180 may initiate the initial coarse search by requesting the memory access module 130 to initiate a search within identified bins 125 for data blocks corresponding (at least partly) with, say, temporal and/or spatial search criteria for the received query, for example based on the single dimensional coordinate reference value, and to load such data blocks into the high speed memory 140.

In this manner, a coarse search of the data storage devices 120 may be carried out to retrieve data blocks containing the required call data records. Significantly, such an example of a coarse search only requires a single dimensional coordinate index search within each bin to locate the relevant data blocks, which may then be transferred to the high speed memory. As a result, the number of relatively slow search operations required to be made within the data storage devices 120 is significantly reduced compared with conventional database storage and retrieval techniques.

The data blocks transferred to high speed memory 140 will contain the wanted call data records. However, there may also be a large number of unwanted call data records also contained within the retrieved data blocks. As such, further processing of the retrieved data blocks may be necessary to isolate the wanted call data records. Such further processing may comprise performing a more refined search within each retrieved data block. Accordingly, the call data search and retrieval component 180 may be further arranged to request the memory access module 130 to initiate a more refined search within retrieved data blocks loaded into the high speed memory 140 to identify and retrieve the wanted call data records. Such a refined search may involve, say, searching data records based on a second dimensional coordinate reference value, and/or any other search criteria relevant to the received query.

Significantly, it is much faster to perform searches through large amounts of data within high speed memory such as RAM than it is to perform equivalent searches within mass storage devices such as magnetic hard drives etc. Accordingly, although the above approach for retrieving data requires two searching operations: the first coarse search within the data storage devices 120; and the refined search within the second high speed memory 130, the amount of time required to locate and retrieve large numbers of individual data records is significantly less than a single (refined) search performed within only the data storage devices 120 due to the speed with which searching is able to be carried out within the high speed memory 140.

Following the retrieval of wanted call data records from the data blocks within high speed memory 140, the call data search and retrieval component 180 forwards the retrieved wanted call data records to the query handler 170, which in turn returns the wanted call data records to, in the illustrated example, the client application 150 from which the query was received.

Figure 7:
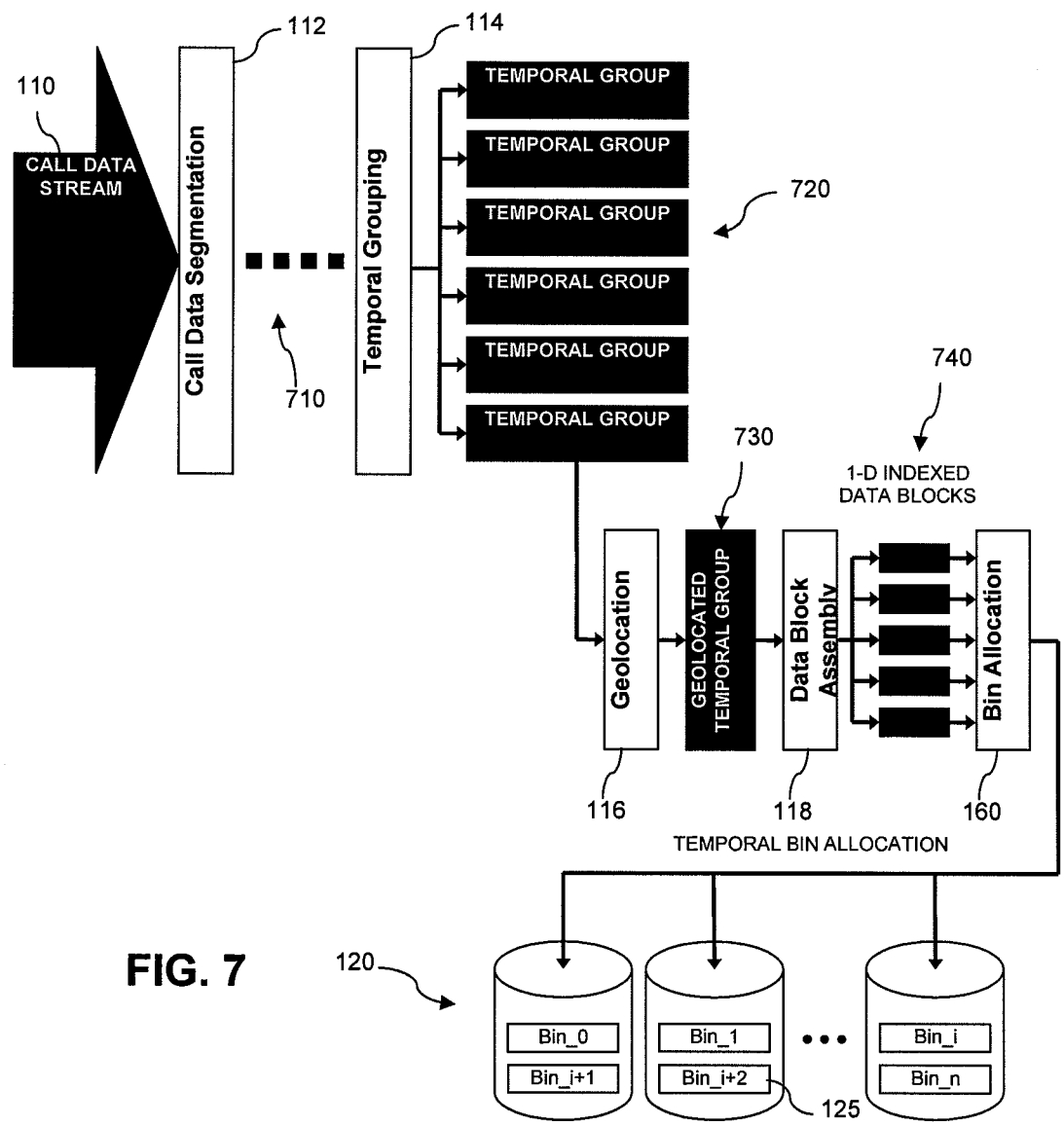
FIG. 7 illustrates a simplified block diagram showing an example of a logical representation of the storing of call data.

Referring now to FIG. 7, there is illustrated a simplified block diagram showing an example of a logical representation of the storing of call data such as may be implemented within the data management system of FIG. 1. Call data is received by way of call data stream 110 and provided to the call data segmentation component 112 which performs call segmentation on the received call data in order to arrange the data into individual call data records, illustrated generally at 710. The call data segmentation component 112 may be arranged to segment the received call data such that each call data record comprises data relating to a single, complete call. Alternatively, the call data segmentation component 112 may be arranged to segment the received call data such that calls may be divided into multiple call data records as described above, which allows the progress of a call to be tracked and stored (e.g. which cell sites are used, which type of service is used and any changes to the service type during the call).

The temporal grouping component 114 groups the individual call data records 710 according to their respective event times, which in the illustrated example results in the call data records being arranged into temporal groups, as illustrated at 720. Accordingly, each temporal group 720 comprises call data records 710 comprising event times within a predefined time period (e.g. a specific hour of a specific day).

Each temporal group 720 of call data records is then provided to the geolocation component 116, which performs geolocation of the individual call data records 710 within a temporal group 720, and adds spatial information to each individual call group record 710. A 'geolocated' temporal group of call data records, illustrated generally at 730, is thus created comprising geographically located call data records relating to a predefined time period (e.g. a specific hour of a specific day).

The geolocated temporal group of call data records 730 is then provided to the data block assembly component 118, which assembles the call data records within the geolocated temporal group 730 into data blocks 740. In particular, in the illustrated example, the data block assembly component 118 is arranged to assemble large 'chunks' of call data records into one-dimensionally indexed data blocks 740, using a single dimensional coordinate value for each call data record. For example, the data block assembly component 118 may be arranged to be spatially grouped based on a single dimensional coordinate value therefor, such coordinate values having been added to the call data records by the geolocation component 116. The data blocks 740 may then be assembled such that each data block 740 comprises, say, call data records comprising the same single dimensional coordinate value, or comprising single dimensional coordinate values within a specified range of such values. In this manner, a single dimensional coordinate indexing may be used for accessing the data blocks 740. Furthermore, the data block assembly component 118 may be arranged to assemble each data block 740 such that individual call data records are of a non-fixed (i.e. variable) size and are stored substantially immediately adjacent one another so that there are substantially no (or minimal) wasted or null bytes in between (as would typically be the case with most database records).

The bin allocation and storage component 160 then allocates each assembled data block 740 to a storage bin 125 within one or more of the data storage devices (e.g. magnetic disks) 120. Having allocated the data blocks to respective storage bins 125, the bin allocation and storage component 160 then stores the data blocks in their allocated storage bins 125.

Figure 8:
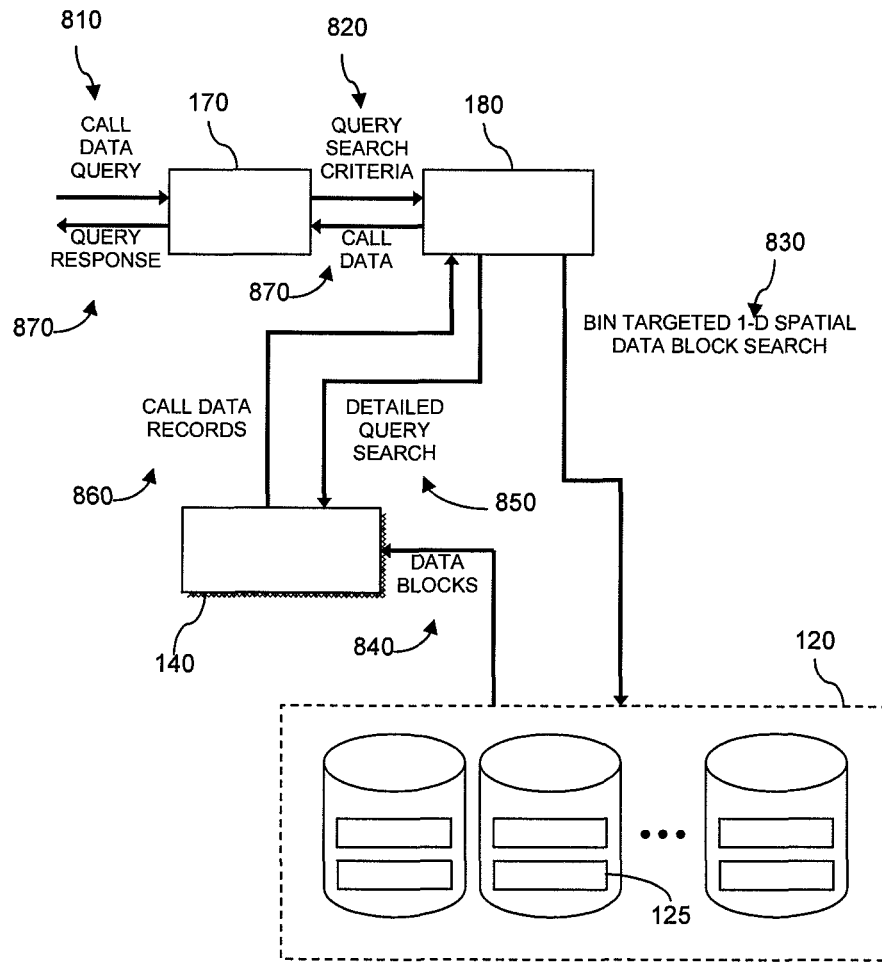
FIG. 8 illustrates a simplified block diagram showing an example of a logical representation of the accessing of stored call data.

Referring now to FIG. 8, there is illustrated a simplified block diagram showing an example of a logical representation of the accessing of stored call data such as may be implemented within the data management system of FIG. 1. When a query 810 is received, for example from a client application, the query handler 170 extracts the required data parameters and generates search criteria for data to be retrieved. In the illustrated example, the call data search and retrieval component 180 initiates an initial 'coarse' search within storage bins 125 based on, for example, spatial and temporal search criteria.

In particular, as described above, the call data records may be stored within data blocks that consist of a large number of spatially and temporally grouped call data records, and are accessible from disk on a 'per-block' basis, with the data blocks being stored within allocated bins 125. As also described above, the data blocks may be indexed within their respective bins 125 using a single dimensional coordinate reference value.

In this manner, a coarse search of the data storage devices 120 may be carried out to retrieve data blocks containing the required call data records. Significantly, such an example of a coarse search only requires a single dimensional coordinate index search within each bin 125 to locate the relevant data blocks, which may then be transferred to the high speed memory 140. As a result, the number of relatively slow search operations required to be made within the data storage devices 120 is significantly reduced compared with conventional database storage and retrieval techniques.

Data blocks found during the search within the identified bins 125 are loaded into the high speed memory 140, as illustrated generally at 840. The call data search and retrieval component 180 then initiates a more refined search within the retrieved data blocks loaded into the high speed memory 140 to identify and retrieve the wanted call data records, as illustrated generally at 850. Such a refined search may involve, say, searching data records based on a second dimensional coordinate reference value, and/or any other search criteria relevant to the received query.

As previously mentioned, it is much faster to perform searches through large amounts of data within high speed memory such as RAM than it is to perform equivalent searches within mass storage devices such as magnetic hard drives etc. Accordingly, although the above approach for retrieving data requires two searching operations, the amount of time required to locate and retrieve large numbers of individual data records is significantly less than a single (refined) search performed within only the data storage devices 120 due to the speed with which searching is able to be carried out within the high speed memory 140.

The wanted call data records found during the refined search within the high speed memory 140 are retrieved by the call data search and retrieval component 180, as indicated generally at 860. The call data search and retrieval component 180 then forwards the retrieved wanted call data records to the query handler 170, as illustrated generally at 870, which in turn returns the wanted call data records to, in the illustrated example, the client application 150 from which the query was received, as illustrated generally at 880.

Figure 9:
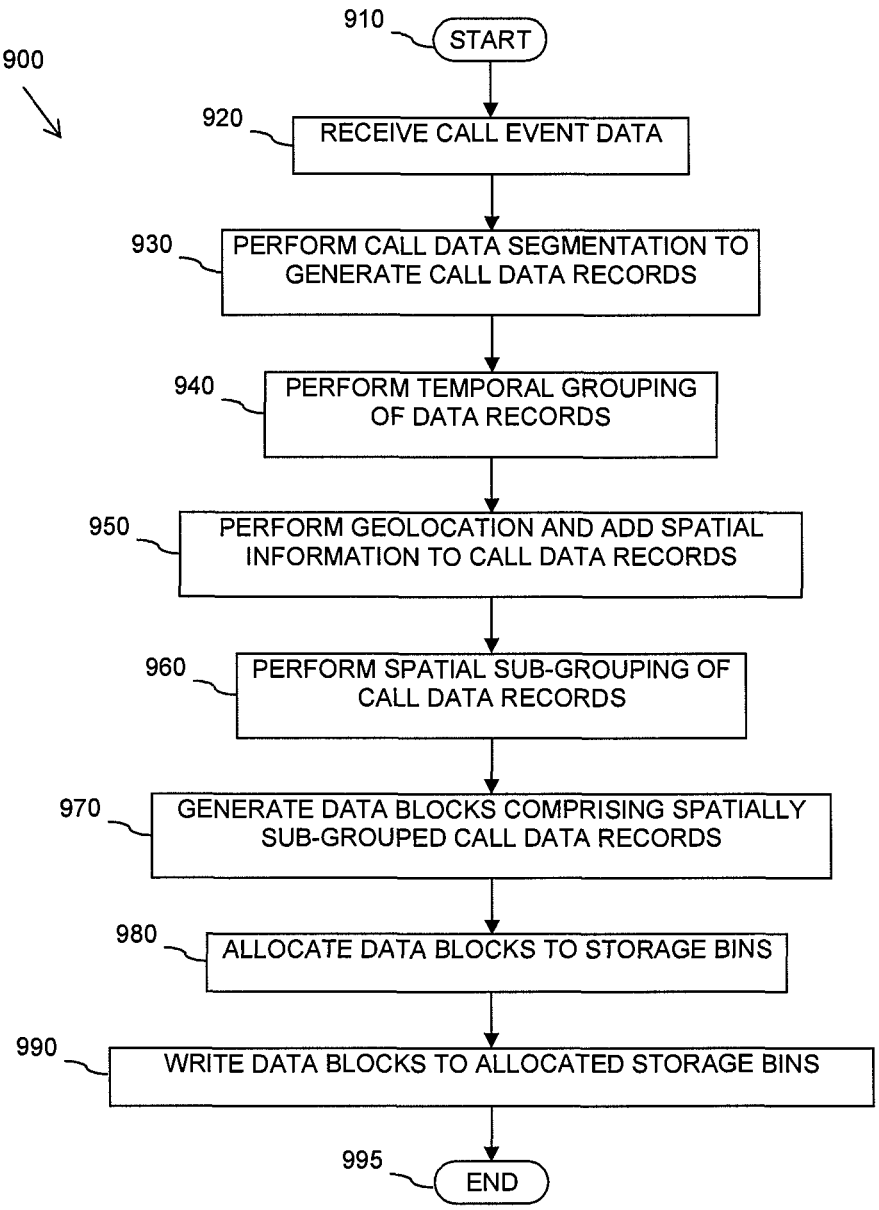
FIGS. 9 to 10 illustrate simplified flowcharts of an example of a method of managing call data within a cellular communication network.
Figure 10:
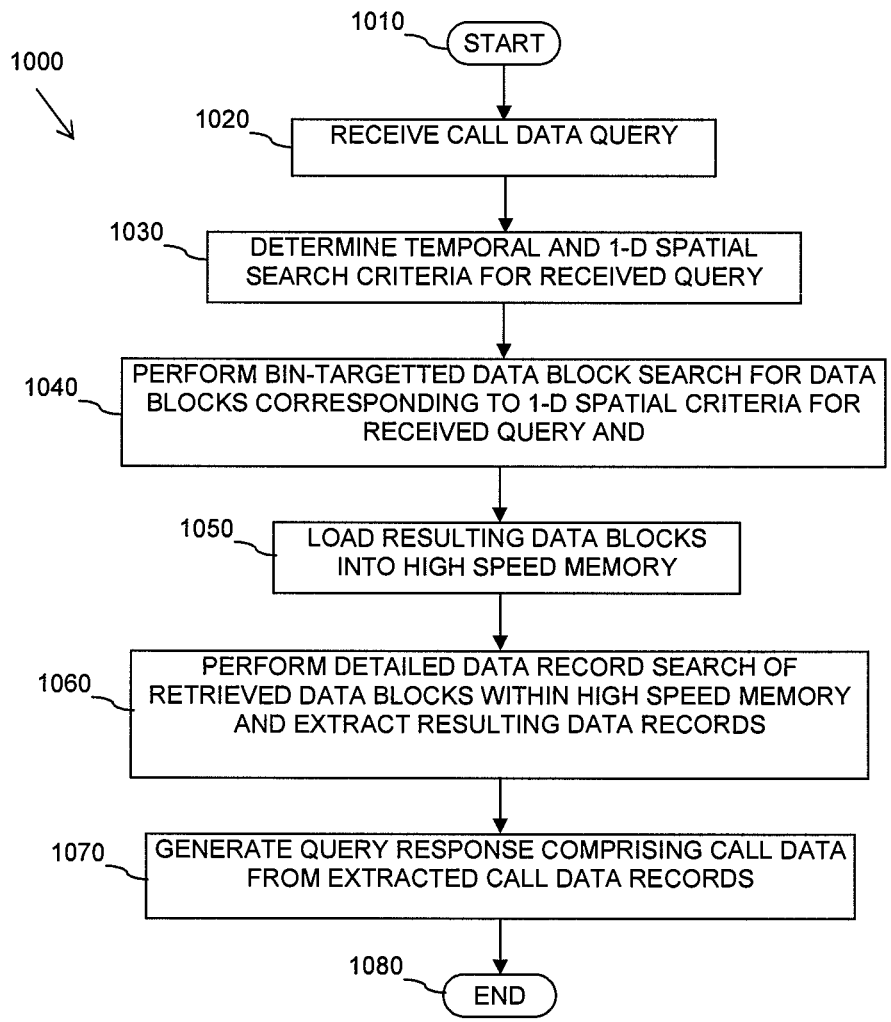
Figure 11:
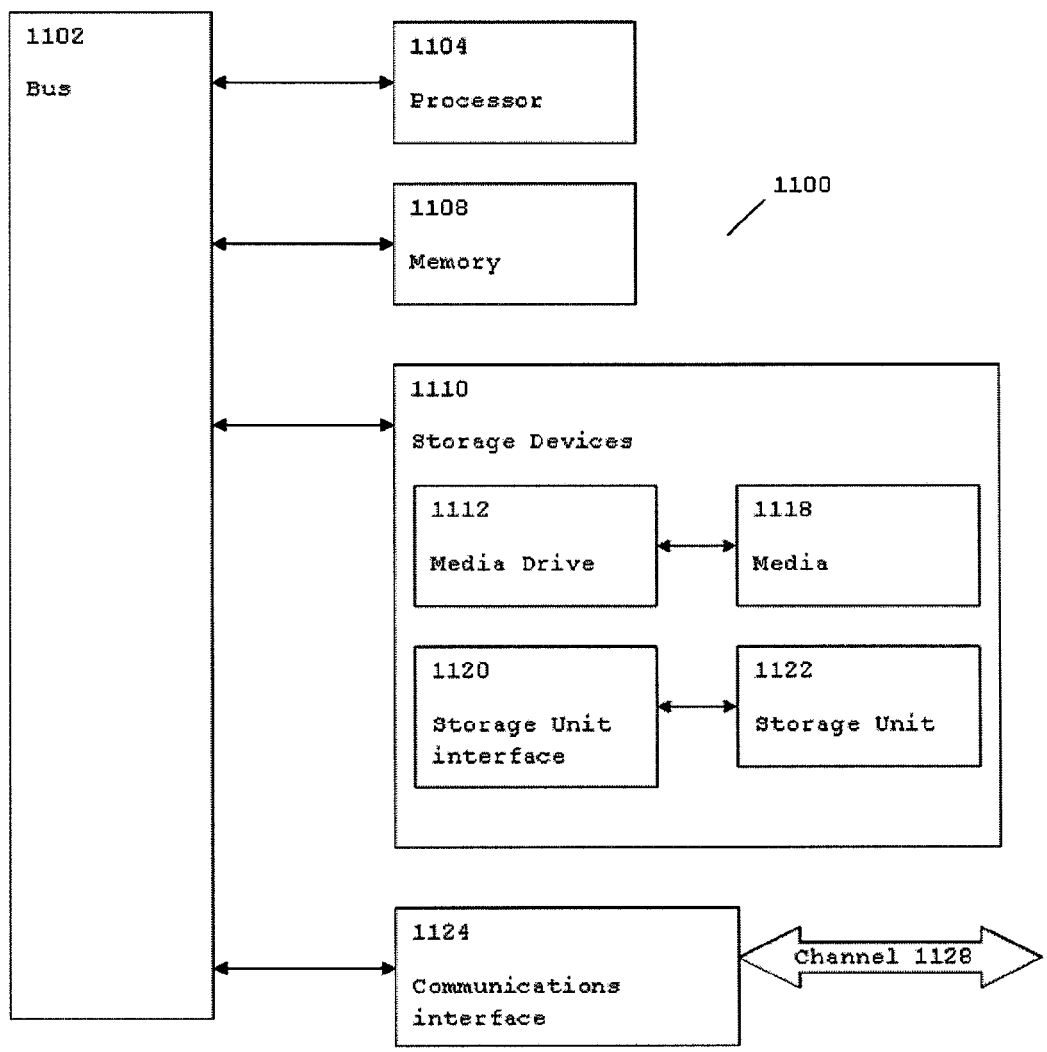
FIG. 11 illustrates a typical computing system that may be employed to implement signal processing functionality in embodiments of the invention.

Referring now to FIGS. 9 and 10 11 there are illustrated simplified flowcharts 900, 1000 of an example method of managing call data, and in particular to a method comprising storing call data and accessing call data.

Referring first to FIG. 9, there is illustrated a simplified flowchart 900 of an example of a method of storing call data, such as may be implemented within the data management system 100 of FIG. 1. The method starts at 910, and moves on to step 920 where call data is received, for example in the form of a stream of raw call data as illustrated at 110 in FIGS. 1 and 7. Next, at step 930, segmentation of the received call data is performed in order to generate individual call data records, for example as described above. The call data records are then temporally grouped, according to their respective event times, at step 940, and geolocation is then performed at 950 and spatial information is added to the call data records. Next, at 960, spatial (sub-) grouping of the call data records is performed, for example based on a single dimensional coordinate reference value for the call data records, and data blocks are assembled comprising the spatially (and temporally) grouped call data records. The assembled data blocks are then allocated to bins within data storage devices, at 980, and are written to their allocated bins at 990, wherein the data blocks may be indexed based at least partly on the single dimensional coordinate reference values of their respective call data records. The method then ends at 995.

Referring now to FIG. 10, there is illustrated a simplified flowchart 1000 of an example of a method of accessing call data stored within one or more data storage devices, such as may be implemented within the data management system 100 of FIG. 1. The method starts at 1010, and moves on to step 1020 where a call data query is received. Next, at step 1030, at least temporal and one dimensional spatial search criteria are determined for the received query, for example based on parameters extracted from the received query. In the illustrated example, an initial, coarse, temporal and/or single dimensional coordinate search for data blocks containing wanted call data records is then performed, at 1040, with relevant data blocks found during the search being loaded into high speed memory at 1050. Next, at 1060, a more refined search within the retrieved data blocks loaded into the high speed memory is performed to identify and extract the wanted call data records. A query response is then generated comprising the extracted wanted call data records, at 1070, and the method ends at 1080.

Referring now to FIG. 11, there is illustrated a typical computing system 1100 that may be employed to implement signal processing functionality in embodiments of the invention. Computing systems of this type may be used in access points and wireless communication units. Those skilled in the relevant art will also recognize how to implement the invention using other computer systems or architectures. Computing system 1100 can include one or more processors, such as a processor 1104. Processor 1104 can be implemented using a general or special-purpose processing engine such as, for example, a microprocessor, microcontroller or other control module. In this example, processor 1104 is connected to a bus 1102 or other communications medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during the execution of instructions to be executed by processor 1104. Computing system 1100 may likewise include a read only memory (ROM) or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1118 may include, for example, a hard disk, floppy disk, magnetic tape, optical disk, CD or DVD, or other fixed or removable medium that is read by and written to by media drive 1112. As these examples illustrate, the storage media 1118 may include a computer-readable storage medium having particular computer software or data stored therein.

In the embodiment of FIG. 11, processor 1104 may fulfill both the roles of:

(i) a data prioritisation module, operable to create a high priority data stream from the stream of communication session data, the high priority data stream comprising a minority of the communication session data for each call;

(ii) a data processing module, operable to process the high priority data stream in real-time, to produce geolocation data for each call, and to provide an immediately accessible copy of both the high priority data stream and the geolocation data for each call.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a universal serial bus (USB) port), a PCMCIA slot and card, etc. Software and data transferred via communications interface 1124 are in the form of signals which can be electronic, electromagnetic, and optical or other signals capable of being received by communications interface 1124.

These signals are provided to communications interface 1124 via a channel 1128. This channel 1128 may carry signals and may be implemented using a wireless medium, wire or cable, fiber optics, or other communications medium. Some examples of a communication channel include a phone line, a cellular phone link, an RF link, a network interface, a local or wide area network, and other communications channels.

In this document, the terms 'computer program product' 'computer-readable medium' and the like may be used generally to refer to media such as, for example, memory 1108, storage device 1118, or storage unit 1122. These and other forms of computer-readable media may store one or more instructions for use by processor 1104, to cause the processor to perform specified operations. Such instructions, generally referred to as 'computer program code' (which may be grouped in the form of computer programs or other groupings), when executed, enable the computing system 1100 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1122, drive 1112 or communications interface 1124. The control module (in this example, software instructions or computer program code), when executed by the processor 1104, causes the processor 1104 to perform the functions of the invention as described herein.

The inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

A computer-readable storage device may be provided with any of these signal processing circuits, having executable program code stored therein for programming signal processing logic to perform the method of the invention. The computer-readable storage device may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by a single processor may alternatively be performed by a plurality of separate processors or controllers. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method comprising:
receiving, by a device, geolocation information associated with call data for at least one call associated with a communication network,
the geolocation information including at least two spatial coordinate values for an at least two dimensional spatial reference;
arranging, by the device and based on receiving the geolocation information, the call data into at least one call data record;
performing, by the device, geolocation on the at least one call data record and at least one other call data record;
adding, by the device and based on performing the geolocation, spatial information to the at least one call data record and the at least one other call data record to create a geolocated group of call data records;
adding, by the device, a single dimensional coordinate value to call data records in the geolocated group of call data records;
indexing, by the device, the call data records using the single dimensional coordinate value;
spatially grouping, by the device, the call data records based on the single dimensional coordinate value for each call data record of the geolocated group of call data records to create spatially grouped call data records; and
assembling, by the device, the spatially grouped call data records into data blocks.

2. The method of claim 1, further comprising:
writing the data blocks to a storage device; and
indexing the data blocks within the storage device using a single dimensional coordinate index.

3. The method of claim 2, further comprising:
retrieving, based on receiving a call data query, one or more call data records, of the geolocated group of call data records, from the storage device on a per data block basis.

4. The method of claim 1, further comprising:
temporally grouping the geolocated group of call data records; and
arranging the temporally grouped call data records into data blocks.

5. A device comprising:
a memory to store instructions; and
a processor to execute the instructions to:
receive geolocation information associated with call data for at least one call associated with a communication network,
the geolocation information including at least two spatial coordinate values for an at least two dimensional spatial reference;
arrange, based on receiving the geolocation information, the call data into at least one call data record; and
perform geolocation on the at least one call data record and at least one other call data record;
add, based on performing the geolocation, spatial information to the at least one call data record and the at least one other call data record to create a geolocated group of call data records;
add a single dimensional coordinate value to call data records in the geolocated group of call data records;
index the call data records using the single dimensional coordinate value;
spatially group the call data records based on the single dimensional coordinate value for each call data record of the geolocated group of call data records to create spatially grouped call data records; and
assemble the spatially grouped call data records into data blocks.

6. A non-transitory computer readable medium storing instructions, the instructions comprising:
one or more instructions which, when executed by a processor, cause the processor to:
receive geolocation information associated with call data for at least one call associated with a communication network,
the geolocation information including at least two spatial coordinate values for an at least two dimensional spatial reference;
arrange, based on receiving the geolocation information, the call data into at least one call data record;
perform geolocation on the at least one call data record and at least one other call data record;
add, based on performing the geolocation, spatial information to the at least one call data record and the at least one other call data record to create a geolocated group of call data records;
identify a single dimensional coordinate value for call data records in the geolocated group of call data records;
index the call data records using the single dimensional coordinate value;
spatially group the call data records based on the single dimensional coordinate value for each call data record of the geolocated group of call data records to create spatially grouped call data records; and
assemble the spatially grouped call data records into data blocks.

7. The method of claim 1, further comprising:
identifying an intra-call event associated with the at least one call;
dividing, based on identifying the intra-call event, the call data into a plurality of call data records; and
storing the plurality of call data records.

8. The method of claim 7, where the intra-call event includes at least one of:
an initiation of the at least one call,
an expiration of a call data segmentation time period,
a generation of a measurement report, or
a change of call service type.

9. The method of claim 1, where the call data includes a plurality of segments,
a first segment, of the plurality of segments, corresponding to an initiation of a call of the at least one call, and
a second segment, of the plurality of segments, corresponding to a termination of the call,
information regarding the first segment and information regarding the second segment being used to determine at least one of:
a cell site associated with the call, or
a change in a service type associated with the call.

10. The device of claim 5, where the processor is further to:
write the data blocks to a storage device; and
index the data blocks within the storage device using a single dimensional coordinate index.

11. The device of claim 10, where the processor is further to:
retrieve, based on receiving a call data query, one or more call data records, of the geolocated group of call data records, from the storage device on a per data block basis.

12. The device of claim 5, where the processor is further to:
temporally group the geolocated group of call data records; and
arrange the temporally grouped call data records into data blocks.

13. The device of claim 5, where the processor is further to:
identify an intra-call event associated with the at least one call;
divide, based on identifying the intra-call event, the call data into a plurality of call data records; and
store the plurality of call data records.

14. The device of claim 13, where the intra-call event includes at least one of:
an initiation of the at least one call,
an expiration of a call data segmentation time period,
a generation of a measurement report, or
a change of call service type.

15. The device of claim 5, where the call data includes a plurality of segments,
a first segment, of the plurality of segments, corresponding to an initiation of a call of the at least one call, and
a second segment, of the plurality of segments, corresponding to a termination of the call,
information regarding the first segment and information regarding the second segment being used to determine at least one of:
a cell site associated with the call, or
a change in a service type associated with the call.

16. The medium of claim 6, where the instructions further include:
one or more instructions to write the data blocks to a storage device; and
one or more instructions to index the data blocks within the storage device using a single dimensional coordinate index.

17. The medium of claim 16, where the instructions further include:
one or more instructions to retrieve, based on receiving a call data query, one or more call data records, of the geolocated group of call data records, from the storage device on a per data block basis.

18. The medium of claim 6, where the instructions further include:
one or more instructions to temporally group the geolocated group of call data records; and
one or more instructions to arrange the temporally grouped call data records into data blocks.

19. The medium of claim 6, where the instructions further include:
one or more instructions to identify an intra-call event associated with the at least one call;
one or more instructions to divide, based on identifying the intra-call event, the call data into a plurality of call data records; and
one or more instructions to store the plurality of call data records.

20. The medium of claim 6, where the call data includes a plurality of segments,
a first segment, of the plurality of segments, corresponding to an initiation of a call of the at least one call, and
a second segment, of the plurality of segments, corresponding to a termination of the call,
information regarding the first segment and information regarding the second segment being used to determine at least one of:
a cell site associated with the call, or
a change in a service type associated with the call.

* * * * *